Figure 1:
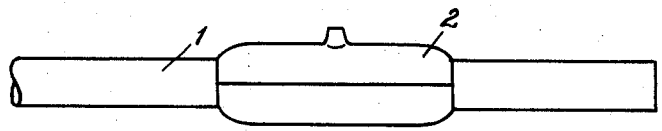

April 2, 1929.  K. SCHLECKER  1,707,324

METHOD OF PRODUCING JOINTS IN OIL FILLED CABLES WITH HOLLOW CONDUCTORS

Filed Feb. 7, 1928

Inventor
Karl Schlecker
by Knight Bros
Attorneys

Patented Apr. 2, 1929.

1,707,324

UNITED STATES PATENT OFFICE.

KARL SCHLECKER, OF BERLIN-GRUNEWALD, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY.

METHOD OF PRODUCING JOINTS IN OIL-FILLED CABLES WITH HOLLOW CONDUCTORS.

Application filed February 7, 1928, Serial No. 252,491, and in Germany March 29, 1927.

My invention relates to a method of producing joints in oil-filled cables with hollow conductors.

It is well known that the joining of high tension cables with hollow conductors, the cavities of which are filled with transformer oil, is very difficult, because the oil runs out of the cable. It was therefore necessary to drain the oil from the cable prior to the erection.

According to my invention this drawback is eliminated by freezing the oil in the vicinity of the cable ends to be joined prior to making the joint. The frozen oil then forms a solid plug or stopper which prevents the oil from flowing out of the cable. The low temperature for freezing the oil is preferably produced by surrounding the place of the cable where the joint is to be produced with liquid air. For this purpose a split or radially divided lead tube or sleeve is placed over the cable joint and tightly sealed against the lead sheath of the cable at both ends and this tube or sleeve is filled with liquid air. Preferably the tube is enclosed by a bad conductor of heat, for instance by embedding it in a wooden box containing sawdust.

After the oil in the vicinity of the cable ends has frozen the joint is made by placing the individual wires of the hollow conductor together and joining them by soldering, the joints being preferably staggered. In order to prevent the solder from entering the interior of the conductor and from obstructing or choking the cavity and thus rendering the flow of the oil impossible, two telescoped tubes are preferably inserted into the conductor. The outer of the two tubes is slightly longer than the joint and has an outer diameter corresponding with the inner diameter of the conductor. The other tube is longer and its outer diameter corresponds with the inner diameter of the wire helix serving as supporting member. When soldering the wires the solder is able to flow along the outer tube, but the longer inner tube prevents it from entering the cavity of the conductor. The inner tube thus ensures the unrestricted flow of the oil from one conductor into the other. To enable the inner tube to be placed into the correct position during the assembly it is provided with spaced recesses and the outer tube is provided with a longitudinal slot through which the inner tube can be pushed into the proper position by means of a pin the point of which engages the recesses in the inner tube.

An embodiment of my invention is illustrated in the drawing affixed hereto and forming part of my invention.

Figure 2:
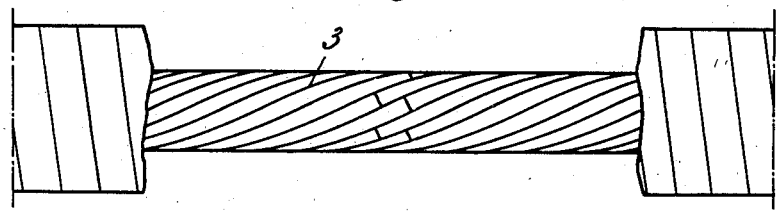
Figure 3:
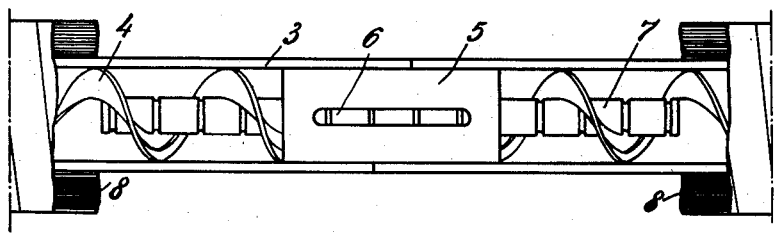

In the drawings:

Fig. 1, represents an elevation of a cable with the sleeve containing the liquid air placed upon it, Fig. 2, the finished joint in elevation, and Fig. 3, the finished joint in longitudinal section.

Referring to the drawings, 1 is the cable, 2 the sleeve or tube for the reception of the liquid air, 3 the conducting wires, 4 the supporting helix of strip metal on edge, 5 the outer tube provided with a slot 6 and 7 the inner tube provided with recesses. Outside of the conductor is placed the cable insulation 8.

Various modifications and changes may be made without departing from the spirit and the scope of the invention, and I desire, therefore, that only such limitations shall be placed thereon as are imposed by the prior art.

I claim as my invention:

1. The method of producing joints in oil-filled cables with hollow conductors, which consists in freezing the oil in the vicinity of the cable ends to be joined prior to the production of the joint and placing two telescopic tubes into the conductor for preventing the solder from entering the interior of the conductor, the outer of said tubes having an external diameter corresponding with the internal diameter of the conductor and the longer inner one an external diameter corresponding with the internal diameter of a helical strip serving as supporting member.

2. The method of producing joints in oil-filled cables with hollow conductors, which consists in freezing the oil in the vicinity of the cable ends to be joined prior to the production of the joint, by surrounding the joining place in the cable with liquid air, and placing two telescopic tubes into the conductor for preventing the solder from entering the interior of the conductor, the outer of said tubes having an external diameter corresponding with the internal diameter of the conductor and the longer inner one an external diameter corresponding with the internal diameter of a helical strip serving as supporting member.

3. The method of producing joints in oil-filled cables with hollow conductors, which consists in freezing the oil in the vicinity of the cable ends to be joined prior to the production of the joint, by surrounding the joining place in the cable with liquid air, said liquid air being filled into a split lead tube placed upon the cable and sealed at the ends, and placing two telescopic tubes into the conductor for preventing the solder from entering the interior of the conductor, the outer of said tubes having an external diameter corresponding with the internal diameter of the conductor and the longer inner one an external diameter corresponding with the internal diameter of a helical strip serving as supporting member.

4. The method of producing joints in oil-filled cables with hollow conductors, which consists in freezing the oil in the vicinity of the cable ends to be joined prior to the production of the joint, by surrounding the joining place in the cable with liquid air, said liquid air being filled into a split lead tube placed upon the cable and sealed at the ends, which is provided with a bad conductor of heat, and placing two telescopic tubes into the conductor for preventing the solder from entering the interior of the conductor, the outer of said tubes having an external diameter crresponding with the internal diameter of the conductor and the longer inner one an external diameter corresponding with the internal diameter of a helical strip serving as supporting member.

In testimony whereof I affix my signature.

KARL SCHLECKER.